May 22, 1934.  A. H. LAW ET AL  1,959,373
ELASTIC FLUID TURBINE DRIVING ELECTRIC GENERATORS
Filed Oct. 21, 1931

INVENTOR
A. H. LAW and
J. P. CHITTENDEN.
ATTORNEY

Patented May 22, 1934

1,959,373

UNITED STATES PATENT OFFICE 1,959,373

ELASTIC FLUID TURBINE DRIVING ELECTRIC GENERATORS

Alexander Henry Law, Stanford, near Rugby, and John Picton Chittenden, South Lodge Westfield, Rugby, England, assignors to English Electric Company, Ltd., London, England, a company of England Application October 21, 1931, Serial No. 570,210
In Great Britain October 24, 1930

3 Claims. (Cl. 290—4)

The usual arrangement of turbo-generator set of given k. v. output consists of two generators each of substantially half the total output of the set independently driven on separate shafts, one by the H. P. turbine stage, and the other by the I. P. and L. P. stages. Whether the shafts are located side by side or in line, the floor space required is considerable and the steam piping between stages long or with arkward bends. This latter especially becomes a serious drawback with very large sizes where said piping may be 3 feet diameter or more.

It is an object of the present invention to save floor space and simplify the piping: to this end the H. P. and I. P. turbines are located side by side with the generators driven thereby extending at opposite ends. In this way total length is saved by the overlapping of the turbines, whilst the width occupied is only that of the two narrowest components of the whole set. For the piping, this arrangement brings the exhaust end of the H. P. turbine adjacent the inlet end of the I. P. turbine, whereby a short direct connection between the two is possible.

It is a further object of the invention to enable the H. P. turbine to be run up by itself for warming purposes or to run independently in the case of vacuum failure or other condenser failure. Still another object is to reduce the runaway, after the tripping of the emergency governor, due to the entrapped high pressure steam in the turbine and the supply conduits. To these ends, the atmospheric relief valve is located on the aforementioned connection between H. P. and I. P. stages. The usual place for the atmospheric relief valve is at the exhaust end of the L. P. turbine, but this entails running the whole set at a small total pressure drop in the event of condenser failure.

Figure 1:
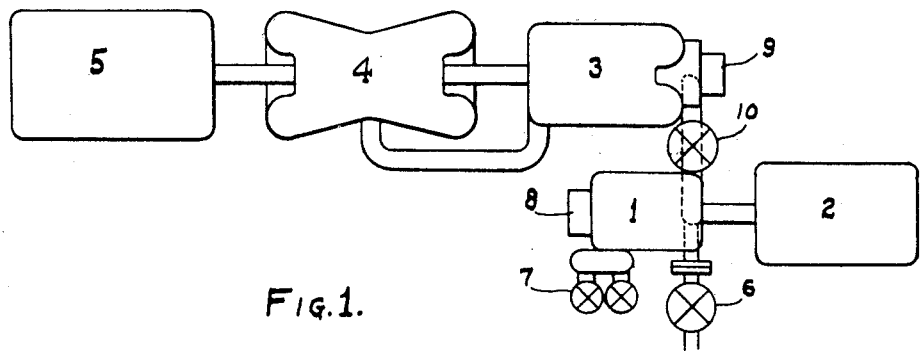
Fig. 1 is a diagrammatic plan view of a turbo-generator set arranged according to the present invention.

Referring to Fig. 1, the H. P. turbine 1 is located beside the I. P. turbine 3, the generator 2 extends to the right hand side, and the L. P. turbine 4 and the generator 5 extend to the left hand side. The atmospheric relief valve 6 is connected to the pipe between the H. P. stage 1 and the I. P. stage 3. 7 indicates the main H. P. inlet valves. A governor and an emergency overspeed tripping device 8 are mounted on the shaft of turbine 1, and an overspeed tripping device 9 is mounted on the shaft of turbine 3.

Figure 2:
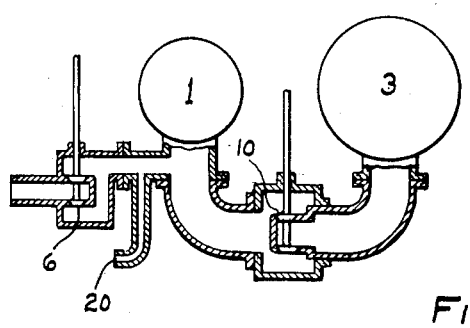
Fig. 2 is a diagrammatic end view showing the interstage pipes and the valves in section.

With the atmospheric relief valve located between H. P. and I. P. stages a valve 10 is necessary to close the passage between these stages, the relief valve 6 being between this valve and the H. P. stage. The valves 6 and 10 are shown in Fig. 1, and also in Fig. 2.

Figure 3:
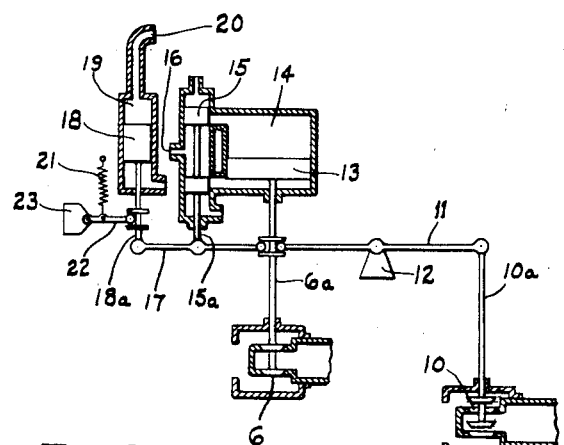
Fig. 3 is a diagrammatic view, partly in section, of the valve operating mechanism.

Under normal conditions valve 6 is shut and valve 10 is open. When it is desired to run the H. P. unit independently, valve 6 is opened and 10 is closed, the two being mechanically interlocked as shown in Fig. 3. The rod 10a of valve 10 is pivotally connected to one end of the mechanical interlock lever 11 which turns about a fixed fulcrum 12 and has its other end pivoted to the rod 6a of valve 6.

When the atmospheric valve is at the exhaust end of the last stage it is kept closed by atmospheric pressure and it opens automatically when a predetermined absolute back pressure has built up in the condenser. In the present arrangement the pressure in the valve will normally be above atmosphere and so some means responsive to the pressure in the condenser is necessary to open the valve.

The automatic servo-motor means for closing the main throttle valve in response to the emergency trip governor may also be employed to operate the atmospheric valve when the emergency trip operates. When this is done it is only the H. P. stage which is affected by the entrapped steam, whilst the latter is enabled to escape more quickly than if it had to traverse all the turbine stages.

The operating means for the atmospheric valve are shown in Fig. 3. Valve-rod 6a carries a piston 13 moving in cylinder 14 under pressure of oil supplied through pipe 16. Valve 15 connects the oil supply either to the top or to the bottom of piston 13. A piston 18 moves in a cylinder 19 which is connected at one end by the pipe 20 to the exhaust from the H. P. turbine 1, between the turbine and the valve 6. The other end of cylinder 19 is open to atmosphere. Valve-rods 6a and 15a and piston-rod 18a are each pivotally connected to link-rod 17. Valve-rod 18a is pulled upwards by spring 21 acting on the link 22 which is pivoted at the fixed fulcrum 23. An adjusting device is provided for the spring. The tension of the spring is adjusted so that the normal pressure in 20 is not quite enough to force the piston 18 down against the pull of the spring. A small predetermined increase in pressure in 20 will however push piston 18 down slightly, and open valve 15 to apply oil pressure under the piston 13. The latter piston will rise opening valve 6 and closing valve 10, and also reclosing 15. Any failure causing back pressure in the condenser or shutting down the lower pressure turbines will cause a rise of pressure in the exhaust end of the H. P. turbine and will tend to open the atmospheric relief valve as described in the preceding sentences. Any subsequent fall of pressure will allow piston 18 to rise and move valve 15 so as to apply oil pressure to the top of piston 13 to reclose valve 6.

A further advantage of the arrangement according to this invention is that the lower pressure stages may be put on load gradually by the automatic operation of the atmospheric relief and interstage valves. At standstill valve 6 will be shut. As turbine 1 starts up alone, the exhaust pressure rises until it exceeds normal and until it forces down piston 18, when valve 6 will open. The pressure then falls allowing piston 18 to rise and the valve to reclose. This opening and reclosing continues, allowing the second unit to start up gradually until normal running conditions are reached, when valve 6 will remain shut.

While we have shown our invention in but one form, it will be obvious to those skilled in the art that it is not so limited but is susceptible of various changes and modifications without departing from the spirit thereof, and we desire, therefore, that only such limitations shall be placed thereupon as are imposed by the prior art or as are specifically set forth in the appended claims.

What we claim is:

1. A turbo-generator set comprising two independently driven generators, a high pressure turbine stage connected to one generator, a lower pressure turbine stage connected to the other generator, a connection between the high pressure stage and the lower pressure stage for conveying the exhaust from the former to the latter, an interstage valve in said connection for controlling the admission of said exhaust to the lower pressure stage, an atmospheric relief valve communicating with said connection intermediate the high pressure stage and the interstage vave, and means responsive to increase in pressure of said exhaust for opening the atmospheric relief valve and closing the interstage valve and responsive to decrease in pressure of said exhaust for closing the atmospheric relief valve and opening the interstage valve.

2. A turbo-generating set comprising a high pressure turbine stage, two or more lower pressure stages, a connection between the high pressure stage and the next stage, two generators independently driven on separate shafts, one by the high pressure turbine stage and the other by one or more lower pressure stages, a valve adapted to open and close the connection between the H. P. and the next stage; a valve which, when open, connects the exhaust of the H. P. stage directly to atmosphere; oil-pressure operated means for opening and closing said atmospheric relief valve; an oil distributing valve; and a loaded pressure-operated device acting on the oil distributing valve so as to open the atmospheric relief valve if the exhaust pressure of the H. P. stage rises above a predetermined value and to reclose the valve when the pressure falls to its normal value.

3. A turbo-generating set according to claim 2 in which the atmospheric relief valve and the interstage valve are mechanically interlocked so that the one is opened when the other is shut and vice versa.

ALEXANDER HENRY LAW.
JOHN PICTON CHITTENDEN.